United States Patent [19]

Bartholomew et al.

[11] Patent Number: 5,017,771

[45] Date of Patent: May 21, 1991

[54] POSITION SENSOR USING OPTICAL FIBERS AND A VARIABLE FILTER

[75] Inventors: Richard D. Bartholomew; Stephen K. Pitalo, both of Huntsville; James R. Schaffer, Jr., Madison, all of Ala.

[73] Assignee: The Boeing Company, Seattle, Wash.

[21] Appl. No.: 438,072

[22] Filed: Nov. 20, 1989

[51] Int. Cl.$^5$ .............................................. H01J 5/16
[52] U.S. Cl. ............................ 250/227.21; 250/227.12
[58] Field of Search ......... 250/237 G, 227.12, 227.23, 250/227.21, 231.18, 231.19, 23.10, 211 K, 237 R; 33/707; 356/373, 375

[56] References Cited

U.S. PATENT DOCUMENTS

| | | | |
|---|---|---|---|
| 2,302,554 | 11/1942 | Kingsbury | 356/43 |
| 3,171,034 | 2/1965 | Tomasulo et al. | 250/237 R |
| 3,416,865 | 12/1968 | Townsend | 356/435 |
| 3,664,752 | 5/1972 | Hermieu | 356/435 |
| 3,755,681 | 8/1973 | Montross | 250/229 |
| 4,103,155 | 7/1978 | Clark | 260/211 K |
| 4,182,935 | 1/1980 | Chown | 350/96.15 |
| 4,275,295 | 6/1981 | Menningen et al. | 250/227.21 |
| 4,278,296 | 6/1981 | Adolfsson | 250/227.21 |
| 4,333,009 | 6/1982 | Stevens | 250/227.12 |
| 4,356,395 | 10/1982 | Miller | 350/96.1 |
| 4,422,180 | 12/1983 | Wendt | 455/603 |
| 4,432,599 | 2/1984 | McMahon | 350/96.15 |
| 4,436,365 | 3/1984 | Hodgins et al. | 350/96.16 |
| 4,481,621 | 11/1984 | Schmack et al. | 370/3 |
| 4,493,995 | 1/1985 | Adolfsson et al. | 455/612 |
| 4,546,466 | 10/1985 | Lopiccolo | 455/612 |
| 4,554,451 | 11/1985 | Kirstein | 250/237 G |
| 4,687,927 | 8/1987 | Iwamoto et al. | 250/231.19 |
| 4,731,530 | 3/1988 | Mikan | 250/227.21 |
| 4,870,269 | 9/1989 | Jeunhomme et al. | 250/227.21 |

Primary Examiner—David C. Nelms
Assistant Examiner—Michael Messinger
Attorney, Agent, or Firm—Finnegan, Henderson, Farabow, Garrett & Dunner

[57] ABSTRACT

An optical position sensor is provided for sensing the position of an object movable along a motion axis. The sensor comprises a light source, a support member, a beamsplitter, a variable filter, and a processor. The light source produces an optical beam that is directed to the beamsplitter. The beamsplitter is fixedly coupled to the support member and optically coupled to the light source, and converts the optical beam into a reference beam and a subject beam. The beamsplitter projects the subject beam along a beam axis fixed relative to the support member. The variable filter is positioned along the beam axis, it is coupled to the object, and it is movably coupled to the support member to be movable along the motion axis in coordination with movement of the object for modulating the subject beam. The transmissivity of the variable filter is nonuniform along the motion axis to attenuate the subject beam in accordance with the position of the object. The processor is optically coupled to the beamsplitter to receive the reference beam and optically coupled to the variable filter to receive the subject beam. The processor compares the subject beam to the reference beam to determine the position of the object.

9 Claims, 2 Drawing Sheets

POSITION SENSOR USING OPTICAL FIBERS AND A VARIABLE FILTER

BACKGROUND OF THE INVENTION

1. Field of the Invention

The present invention relates to an optical position sensor and, more specifically, to an optical position sensor for optically sensing the position of a movable object.

2. Description of the Related Art

Known sensors for sensing the position of an object, for example, the position of a mechanical actuator, typically include electro-mechanical or electromagnetic components for converting mechanical movements of the object into corresponding electrical signals. Such sensor designs are disadvantageous for many applications because they are susceptible to unwanted electromagnetic interference, current or voltage surges, and electro-static arcing. Electro-mechanical components may also be vulnerable to dirt, corrosion, vibration and wear.

More recently, optical position sensors have gained favor in part because they generally alleviate the drawbacks of electromagnetic and electro-mechanical devices such as those noted above. The applicability of these devices has generally been somewhat limited, however, since they typically include electro-optic components that may also be susceptible to the phenomena described above, and because they tend to be expensive, complex, and difficult to calibrate, operate and maintain.

Accordingly, it is an object of the present invention to provide an optical position sensor for sensing the position of a movable object, the sensor being simple in design and operation, and alleviating adverse effects such as those described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, an optical position sensor is provided for sensing the position of an object movable along a motion axis. The sensor comprises a light source for producing an optical beam; a support member; beamsplitting means fixedly coupled to the support member and optically coupled to the light source for converting the optical beam into a reference beam and a subject beam, and for projecting the subject beam along a beam axis fixed relative to the support member; variable filter means positioned transverse the beam axis, coupled to the object and movably coupled to the support member to be movable along the motion axis in coordination with movement of the object for modulating the subject beam, the transmissivity of the variable filter means being nonuniform along the motion axis to attenuate the subject beam in accordance with the position of the object; and comparing means optically coupled to the beamsplitting means to receive the reference beam and optically coupled to the variable filter means to receive the subject beam for comparing the subject beam to the reference beam to determine the position of the object.

In accordance with a first preferred embodiment, the optical position sensor includes a first optical conduit having a first end fixedly positioned relative to the beamsplitting means and a second end coupled to the light source for communicating the optical beam from the light source to the beamsplitting means; a second optical conduit having a first end fixedly positioned relative to the beamsplitting means and a second end coupled to the comparing means for communicating the reference beam from the beamsplitting means to the comparing means; and a third optical conduit having a first end fixedly positioned on the beam axis opposite the variable filter means from the beamsplitting means and a second end coupled to the comparing means for communicating the subject beam from the filter means to the comparing means.

In accordance with a second preferred embodiment, the optical position sensor includes an optical conduit having a first end portion with a first branch end optically coupled to the light source and a second branch end optically coupled to the comparing means. The optical conduit also has a second end portion having a first branch end fixedly positioned relative to the beamsplitting means and optically coupled to the beamsplitting means to project the optical beam onto the beamsplitting means, a second branch end fixedly positioned relative to the beamsplitting means and optically coupled to the beamsplitting means to receive the reference beam, and a third branch end fixedly positioned on the beam axis opposite the variable filter means from the beamsplitting means to receive the subject beam. Preferably, the distance from the beamsplitting means to the comparing means along a first optical path which includes the second branch end of the second end portion is a constant non-unity multiple of the distance from the beamsplitting means to the comparing means along a second optical path which includes the third branch end of the second end portion. Accordingly, the second branch end of the second end portion may include delay means for delaying the reference beam relative to the subject beam. Similarly, the third branch end of the second end portion may include delay means for delaying the subject beam relative to the reference beam. An example of such delay means is a coiled segment of an optical fiber. In the second preferred embodiment, the comparing means preferably includes time demultiplexing means for separating the reference beam from the subject beam based on the respective times of arrival of the reference beam and the subject beam at the comparing means.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. Of the drawings.

DESCRIPTION OF THE PREFERRED EMBODIMENTS

Figure 1:
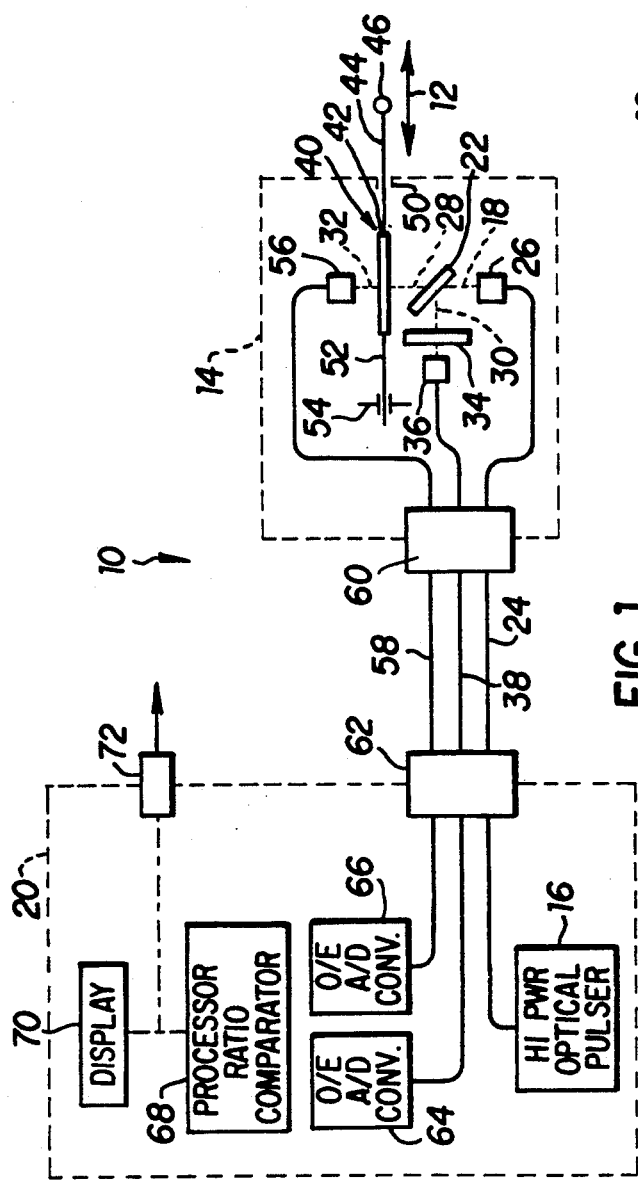
FIG. 1 illustrates an optical position sensor according to a first preferred embodiment of the invention.

Reference will now be made in detail to the presently preferred embodiments of the invention as illustrated in the accompanying drawings, in which like reference characters designate like or corresponding parts throughout the several drawings.

An optical position sensor 10 in accordance with a first preferred embodiment of the invention is illustrated in FIG. 1. Optical sensor 10 is adapted to sense the position or movement of an object (not shown) movable along a motion axis 12 (parallel to the drawing sheet of FIG. 1). The types of objects whose position or movement the optical position sensor can sense may vary widely depending on the application. For example, the object may be a mechanical actuator regulating the position of a flight control surface of an aircraft, or a mechanical arm in industrial processing equipment.

Optical position sensor 10 includes a support member 14, preferably a rigid planar structure capable of supporting various components of sensor 10 in fixed relation to one another as described below. Examples of support member 14 might include the fixed portion of an aircraft control surface to which a hinged movable portion of the control surface is coupled, or the structural support to which a mechanical arm of an industrial machine is movably coupled.

Optical position sensor 10 also includes a light source 16 for producing an optical beam 18. Light source 16 preferably comprises a high-power optical pulser that produces a periodic, high-energy, short duration light pulse of known frequency composition. In this embodiment, light source 16 is mounted to or incorporated into a housing separate and spaced from support member 14, such as a signal conditioner 20.

Optical position sensor 10 also includes beamsplitting means, such as a 50:50 beamsplitter 22, fixedly coupled to support member 14. Light source 16 is optically coupled to beamsplitter 22 by an optical conduit such as an optical fiber 24. One end of optical fiber 24 is coupled to light source 16. The other end of fiber 24 is coupled to a collimating lens 26 rigidly coupled to support member 14 to fixedly position it relative to beamsplitter 22. This arrangement causes optical beam 18 to be communicated from light source 16 along fiber 24 to lens 26, which collimates the beam and directs it along a beam axis 28 (parallel to the drawing sheet of FIG. 1) fixed relative to support member 14 and substantially perpendicular to motion axis 12. Beamsplitter 22, which is positioned along beam axis 28, converts optical beam 18 into a reflected reference beam 30 and a transmitted subject beam 32, and projects subject beam 32 along beam axis 28. Because optical beam 18 comprises pulsed light, reference beam 30 actually comprises a corresponding number of reference beam pulses and subject beam 32 actually comprises a corresponding number of subject beam pulses.

Beamsplitter 22 directs reference beam 30 to a constant neutral density filter 34 and to a collecting lens 36, both rigidly mounted to support member 14 and fixedly positioned relative to beamsplitter 22. Lens 36 focuses and optically couples reference beam 30 to one end of an optical conduit such as an optical fiber 38.

Figure 2:
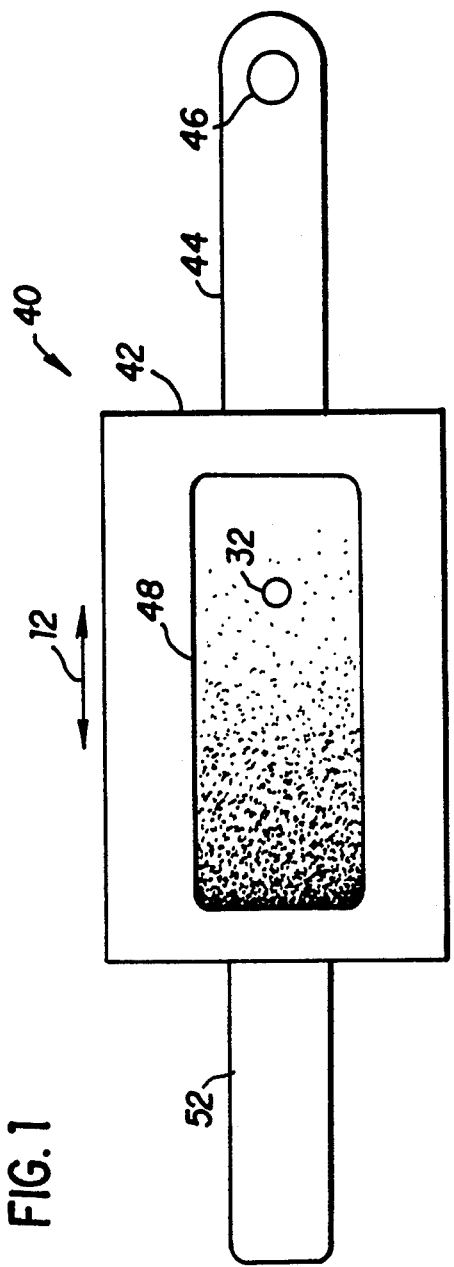
FIG. 2 illustrates a variable filter of the optical position sensor shown in FIG. 1.

Optical sensor 10 further includes variable filter means, such as a variable neutral density filter 40, positioned along beam axis 28. FIG. 1 includes a side view of variable filter 40 that is perpendicular to a plane defined by motion axis 12 and beam axis 28 (the plane of the drawing sheet of FIG. 1). FIG. 2 shows a view of variable filter 40 that is along beam axis 28.

As shown in FIGS. 1 and 2, filter 40 includes a substantially flat frame member 42 and an arm 44 extending outwardly from frame member 42. Fastening means 46, such as an aperture or universal mechanism suitable to fasten the object to arm 44, are provided at the end of arm 44 away from frame member 42 to rigidly or semi-rigidly couple frame member 42 to the object.

Filter 40 also includes a substantially planar transmission window 48 rigidly disposed on or within frame member 42. The transmissivity of window 48 is nonuniform in the dimension of motion axis 12. A variety of shading schemes or functions can be used for window 48. For example, the transmissivity of window 48 as a function of position on window 48 along motion axis 12 (left to right in FIG. 2) can vary linearly or nonlinearly, depending on the desired application and the nature of the photodetector of the comparing means (described below). Preferably, window 48 is linearly shaded along motion axis 12 as shown in FIG. 2 so that a spot beam projected through window 48, i.e., subject beam 32, is linearly attenuated as variable filter 40 is moved from left to right along motion axis 12.

Referring again to FIG. 1, filter 40 is slidably coupled to support member 14 to move along and parallel to motion axis 12, for example, using a bushing 50 on support member 14 to slidably support arm 44 and a slidable tongue 52 and groove 54 assembly in frame member 42 and support member 14, respectively, to support the end of frame member 42 opposite arm 44. Filter 40 is slidably positioned on support member 14 so that beam axis 28 passes through window 48 substantially perpendicularly for the entire range of movement of filter 40.

Arm 44 of filter 40 is fastened at fastener 46 to the object so that filter 40 moves along motion axis 12 in coordination with movement of the object. When subject beam 32 is projected along beam axis 28 through window 48, movement of the object along motion axis 12 causes filter 40 to modulate subject beam 32 in accordance with object movement and, thus, in accordance with the position of the object.

Optical position sensor 10 further includes a collecting lens 56 and an optical conduit, such as an optical fiber 58, for receiving reference beam 32 after it has passed through and been appropriately attenuated by filter 40. One end of optical fiber 58 is coupled to lens 56. Lens 56 and the end of fiber 58 coupled to lens 56 are fixedly positioned on support member 14 relative to beamsplitter 22 opposite beamsplitter 22 relative to filter 40. Lens 56 lies on beam axis 28 and optically couples subject beam 32 to fiber 58.

Optical fibers 24, 38 and 58 are coupled to signal conditioner 20 via optical couplers 60 and 62 at support member 14 and signal conditioner 20, respectively. As noted above, signal conditioner 20 includes light source 16, which is coupled to optical fiber 24. Signal conditioner 20 also includes comparing means coupled to optical fibers 38 and 58 and, therefore, optically coupled to beamsplitter 22 to receive reference beam 30 and to filter 40 to receive subject beam 32. The comparing means compares subject beam 32 to reference beam 30 to determine the position of the object.

The comparing means preferably includes a pair of optoelectronic analog-to-digital (A/D) converters 64 and 66, processing means such as a ratio comparator processor 68, and output means such as a display monitor 70 and digital output port 72. Optical fiber 38 is coupled to A/D converter 64 and optical fiber 58 is coupled to A/D converter 66. Therefore, reference beam 30 is communicated from beamsplitter 22 to A/D converter 64, and appropriately attenuated subject beam 32 is communicated from beamsplitter 22 through variable filter 40 to A/D converter 66. A/D converters 64 and 66 include photodetectors for converting the beams into electrical signals respresentative of the amplitude of the respective beams or pulses and converters for converting the respective electrical signals into digital signals. A/D converters 64 and 66 are coupled to and communicate the respective digital signals to processor 68. Processor 68, which preferably includes digital arithmetic logic circuitry, compares the digital signals to obtain a ratio indicative of the amplitude of subject beam 32 relative to the amplitude of reference beam 30. This ratio is outputted by processor 68 to monitor 70 and digital output port 72 after being appropriately conditioned and formatted by circuitry within processor 58 or signal conditioner 20.

The operation of the optical position sensor of the first preferred embodiment will now be described with reference to FIG. 1. Light source 16 transmits optical beam 18 through optical fiber 24 and to collimating lens 26. Lens 26 collimates optical beam 18 and directs it along beam axis 28 to beamsplitter 22. Beamsplitter 22 splits optical beam 18 into reference beam 30 (reflected) and subject beam 32 (transmitted). The amplitude of reference beam 30 immediately after being reflected by beamsplitter 22 is substantially identical to the amplitude of subject beam 32 immediately after subject beam 32 is transmitted by beamsplitter 22. Reference beam 30 passes through constant filter 34 to collecting lens 36, which couples the beam to optical fiber 38. Reference beam 30 is communicated by fiber 38 to A/D converter 64, which converts reference beam 30 into a digital reference beam signal indicative of the amplitude of reference beam 30 as received at A/D converter 64. Subject beam 32 is transmitted by beamsplitter 22 and is directed along beam axis 28 through filter 40 to collecting lens 56. Movement of the object produces corresponding movement of filter 40 along motion axis 12, which varies the physical position of transmission window 48. This attenuates the amplitude of subject beam 32 in accordance with the instantaneous position of the object, thereby impressing information on, or amplitude modulating, subject beam 32. The modulated subject beam 32 is coupled by lens 56 to optical fiber 58, which communicates the beam to A/D converter 66. A/D converter 66 converts modulated subject beam 32 into a digital subject beam signal indicative of the amplitude of subject beam 32 as received at A/D converter 66. Processor 68 receives corresponding values of the digital reference beam signal and the digital subject beam signal from A/D converters 64 and 66, respectively, and calculates a ratio of these signal values. This ratio is then displayed on monitor 70 and outputted to digital output port 72 to provide useful information about the position of the object, i.e., its instantaneous position. Initial placement of the object and variable filter 40 to a known position can be undertaken to calibrate the device. Thereafter, movement of the object is detected and its position determined based on variation of the amplitude ratio from the calibrated reference value.

Figure 3:
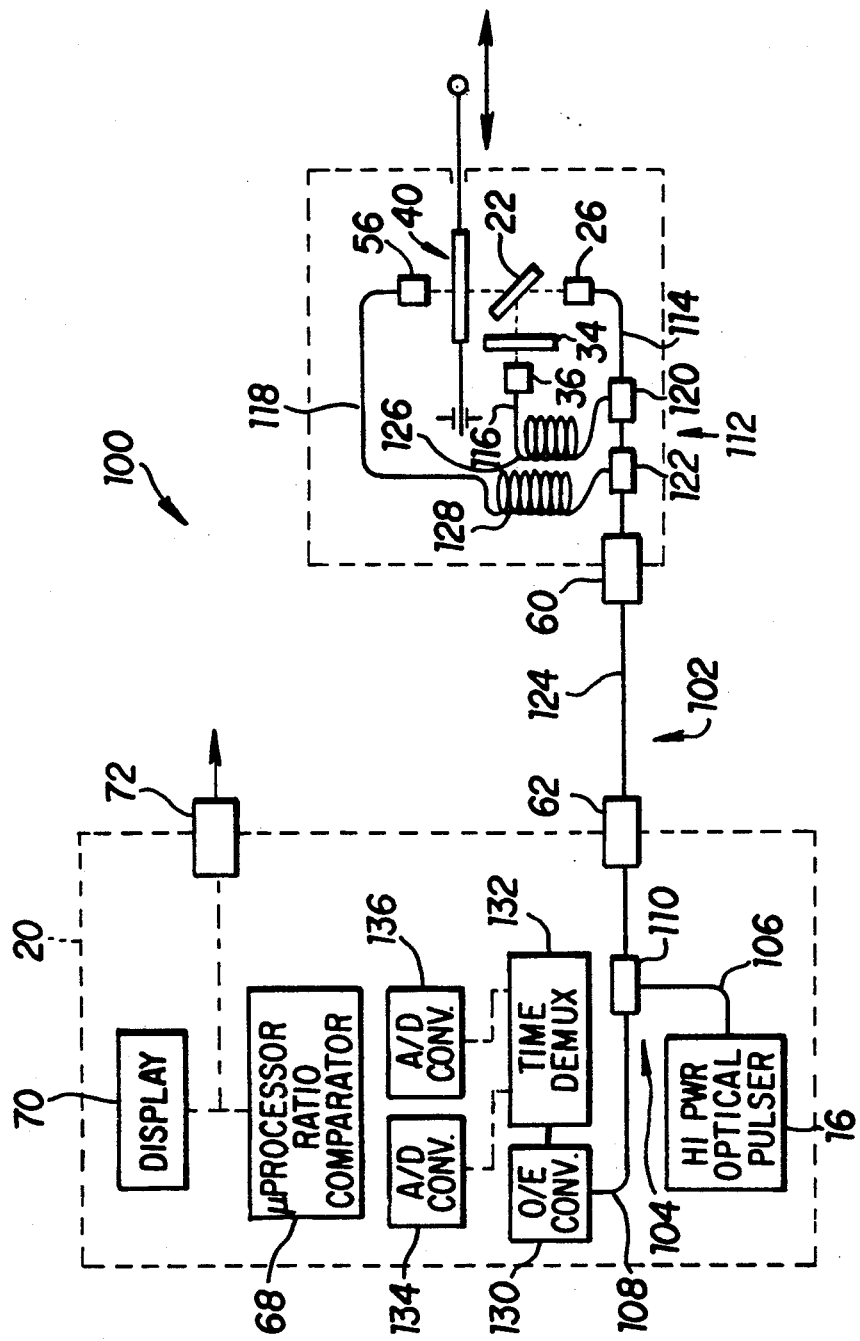
FIG. 3 illustrates an optical position sensor according to a second preferred embodiment of the invention.

A second preferred embodiment of the invention is illustrated in FIG. 3. This embodiment differs from the first embodiment principally in its use of a single optical conduit rather than three separate optical conduits to couple the various elements on support member 14 to those of signal conditioner 20. In accordance with the second preferred embodiment, an optical position sensor 100 includes a support member 14 and a signal conditioner 20 as in the first embodiment. Beamsplitter 22, filters 34 and 40, and lenses 26, 36 and 56 are mounted on support member 14, and light source 16, processor 68, display monitor 70 and digital output port 72 are included in signal conditioner 20, also as in the first embodiment.

Optical position sensor 100 further includes an optical conduit such as an optical fiber 102 for coupling selected components on support member 14 to selected components of signal conditioner 20. Optical fiber 102 includes a first end portion 104 having a first branch end 106 optically coupled to light source 16 and a second branch end 108 optically coupled to the comparing means. Preferably, first branch end 106 and second branch end 108 are coupled by a directional coupler 110.

Optical fiber 102 also includes a second end portion 112 having a first branch end 114 fixedly positioned relative to beamsplitter 22 and optically coupled to beamsplitter 22 to project optical beam 18 onto beamsplitter 22, a second branch end 116 fixedly positioned relative to beamsplitter 22 and optically coupled to beamsplitter 22 to receive reference beam 30, and a third branch end 118 fixedly positioned relative to beamsplitter 22 opposite beamsplitter 22 relative to filter 40 and optically coupled to filter 40 to receive subject beam 32. Preferably, second branch end 116 is coupled to first branch end 114 by a directional coupler 120, and third branch end 118 is coupled to first branch end 114 by a directional coupler 122.

Optical fiber 102 has a center segment 124 located between direction couplers 110 and 122. In accordance with this preferred embodiment, optical fiber 102 comprises a separate, main optical fiber which includes second branch end 108, center segment 124, and first branch end 114. Each of first branch end 106, second branch end 116, and third branch end 118 comprise a separate optical fiber coupled to the main optical fiber by directional couplers 110, 120 and 122, respectively.

The optical position sensor of the second preferred embodiment uses a single optical conduit, i.e., optical fiber 102, both to transmit optical beam 18 from light source 16 to beamsplitter 22 and to communicate the subject and reference beams back to the comparing means in signal conditioner 20. Although a number of approaches are available to multiplex these beams onto optical fiber 102, the embodiment of FIG. 3 uses a time division multiplexing approach in which the subject and reference beams arrive at the comparing means at separate, non-overlapping times. The subject and reference beams originate at beamsplitter 22. Reference beam 30 travels a path that includes filter 34, second branch end 116, center segment 124, and second branch end 108. Subject beam 32 travels a path that includes filter 40, third branch end 118, center segment 124, and second branch end 108. Because light source 16 generates optical beam 18 as pulsed light, time division multiplexing is achieved in this embodiment by selecting the lengths of the optical paths traversed by reference beam 30 and subject beam 32 so that one such path is longer than the other, thereby causing the beam traveling the greater distance to arrive at the comparing means after the beam traveling the lesser distance. The path length difference is selected to be long enough that corresponding pulses of reference beam 30 and subject beam 32 do not overlap, but short enough that ambiguities are not caused by overlapping arrival of successive pulses of optical beam 18.

Accordingly, optical position sensor 100 is configured so that the distance from beamsplitter 22 to the comparing means along a first optical path traveled by reference beam 30 which includes second branch end 116 is a constant non-unity multiple of the distance from beamsplitter 22 to the comparing means along a second optical path traveled by subject beam 32 which includes third branch end 118. To achieve this result, second branch end 116 may include delay means for delaying reference beam 30 relative to subject beam 32. Alternatively, third branch end 118 may include delay means for delaying subject beam 32 relative to reference beam 30.

In accordance with the embodiment of FIG. 3, second branch end 116 has a segment including a series of coils 126 which extend the length of second branch end 116 sufficiently to delay reference beam 30, e.g., for several nanoseconds. This length together with the length of branch ends 108 and 116, and the configuration of lenses 26 and 36, are selected so that an excitation pulse of optical beam 18 travels from light source 16 along center segment 124 to beamsplitter 22, through filter 34 and branch end 116, back along center segment 124, and through branch end 108 to the comparing means after the excitation pulse has subsided but before the next excitation pulse is initiated.

Also in accordance with the embodiment of FIG. 3, third branch end 118 has a segment including a series of coils 128 which extend the length of third branch end 118 sufficiently to delay subject beam 32 for an additional period of time, e.g., several nanoseconds greater than that caused by second branch end coils 126. The length of branch end 118 and the distance of lens 56 from beamsplitter 22 are selected so that an excitation pulse of optical beam 18 travels from light source 16 along center segment 124 to beamsplitter 22, through filter 40 and branch end 118, back along center segment 124, and through branch end 108 to the comparing means after the corresponding reference beam pulse has been received at the comparing means but before the next excitation pulse of optical beam 18 is initiated.

The comparing means of optical position sensor 100 includes time demultiplexing means for separating the reference beam from the subject beam based on the respective times of arrival of the reference beam and the subject beam at the comparing means. Preferably, the comparing means includes an optical-to-electrical (O/E) converter 130 coupled to branch end 108 of optical fiber 102, a time demultiplexer 132 coupled to O/E converter 130, and a pair of A/D converters 134 and 136 coupled to time demultiplexer 132 and processor 68. O/E converter 130 converts any optical beam received from branch end 108 of fiber 102 into a corresponding electrical signal indicative of the amplitude of the beam. Time demultiplexer 132 receives the electrical signals from O/E converter 130 and time demultiplexes, or separates according to time of arrival, electrical signals corresponding to reference beam 30 from those corresponding to subject beam 32. A/D converter 134 receives only the electrical signals from time demultiplexer 132 corresponding to reference beam 30, and converts these electrical signals into digital form. Similarly, A/D converter 136 receives only the electrical signals from time demultiplexer 132 corresponding to subject beam 32, and converts these electrical signals into digital form. Processor 68 receives corresponding digital signals from A/D converters 134 and 136 and calculates their ratio as described above with regard to the embodiment of FIG. 1.

The operation of optical position sensor 100 will now be described with reference to FIG. 3. Light source 16 transmits an excitation pulse of optical beam 18 through fiber branch end 106. The pulse is coupled to center segment 124 at directional coupler 110 and travels along segment 124 past couplers 122 and 120 to collimating lens 26. Lens 26 collimates the optical beam pulse and directs it along beam axis 28 and to beamsplitter 22. Beamsplitter 22 splits the optical beam pulse into a reference beam pulse and a corresponding subject beam pulse. The pulse amplitude of the reference beam pulse immediately after being reflected by beamsplitter 22 is substantially identical to the amplitude of the subject beam pulse immediately after the subject beam pulse is transmitted by beamsplitter 22, and the corresponding reference beam and subject beam pulses leave beamsplitter 22 essentially simultaneously. The reference beam pulse passes through constant filter 34 to lens 36, which couples the beam pulse to branch end 116 of optical fiber 102. The reference beam pulse travels through second branch end coils 126 and is coupled to center segment 124 at directional coupler 120. The reference beam pulse travels in center segment 124 past directional coupler 110 and into fiber branch end 108 to O/E converter 130.

The reference beam pulse is converted by O/E converter 130 to an electrical signal indicative of the reference pulse amplitude and communicated to time multiplexer 132.

A corresponding subject beam pulse is transmitted by beamsplitter 22 and is directed along beam axis 28 through variable filter 40 to collecting lens 56. As described above with regard to the embodiment of FIG. 1, movement of the object produces corresponding movement of variable filter 40 along motion axis 12, which varies the physical position of transmission window 48. This attenuates the amplitude of the subject beam pulse in accordance with the instantaneous position of the object and amplitude modulates the subject beam pulse.

The modulated subject beam pulse is coupled by lens 56 to fiber branch end 118. The pulse travels along branch end 118 through third branch end coils 128 and is coupled to center segment 124 at directional coupler 122. The subject beam pulse travels in center segment 124 past directional coupler 110 and into fiber branch end 108 to O/E converter 130, where it is converted by O/E converter 130 to an electrical signal indicative of the subject beam pulse amplitude and communicated to time multiplexer 132.

A travel time delay for the reference beam pulse is introduced by constant filter 34 and second branch end coils 126. As noted above, the magnitude of the delay is selected, e.g., by selecting the length of second branch end 116, so that the reference beam pulse arrives at O/E converter 130 after the optical beam excitation pulse has subsided but before the initiation of a subsequent excitation pulse. Similarly, a travel time delay for the subject beam pulse is introduced by variable filter 40 and third branch end coils 128. Also as noted above, the magnitude of the delay is selected, e.g., by selecting the length of third branch end 118, to be longer than that of the reference beam pulse path, so that the subject beam pulse arrives at O/E converter 130 after the trailing edge of the reference beam pulse has been received at O/E converter 130 but before the initiation of a subsequent excitation pulse.

Time demultiplexer 132 uses this time difference of arrival to separate the electrical signals corresponding to the reference beam pulse from those corresponding to the subject beam pulse, for example, using known gating techniques. The electrical signals corresponding to the reference beam pulse are transferred to A/D converter 134, which converts the signals into corresponding digital signals and holds these digital reference beam signals for access by processor 68. Similarly, the electrical signals corresponding to the subject beam pulse are transferred to A/D converter 136, which converts the signals into corresponding digital signals and holds these digital subject beam signals for access by processor 68.

Processor 60 receives the digital reference beam signal and the digital subject beam signal from A/D converters 134 and 136, respectively, and calculates a ratio of these signal values. This ratio is then displayed on monitor 70 and output to digital output port 72 to provide the instantaneous position of the object.

Additional advantages and modifications will readily occur to those skilled in the art. For example, variations in the specific designs of the light source, variable filter means, and delay means may be made. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An optical position sensor for sensing the position of an object movable along a motion axis, said sensor comprising:
   a light source for producing an optical beam;
   a support member;
   beamsplitting means fixedly coupled to said support member and optically coupled to said light source for converting the optical beam into a reference beam and a subject beam, and for projecting the subject beam along a beam axis fixed relative to said support member;
   variable filter means positioned along the beam axis, coupled to the object and movably coupled to said support member to be movable along the motion axis in coordination with movement of the object for modulating the subject beam, the transmissivity of said variable filter means being nonuniform along the motion axis to attenuate the subject beam in accordance with the position of the object;
   a photodetector optically coupled to said beamsplitting means to convert the reference beam into a reference signal and optically coupled to said variable filter means to convert the subject beam into a subject signal; and
   comparing means coupled to said photodetector for comparing the subject signal to the reference signal to determine the position of the object.

2. An optical position sensor as recited in claim 1, further comprising:
   a first optical conduits having a first end coupled to said light source and a second end fixedly positioned relative to said beamsplitting means for communicating the optical beam from said light source to said beamsplitting means;
   a second optical conduit having a first end fixedly positioned relative to said beamsplitting means and a second end coupled to said photodetector for communicating the reference beam from said beamsplitting means to said photodetector; and
   a third optical conduit having a first end fixedly positioned on the beam axis opposite said variable filter means form said beamsplitting means and a second end coupled to said photodetector for communicating the subject beam from said variable filter means to said photodetector.

3. An optical position sensor as recited in claim 1, further comprising an optical conduit, said optical conduit including,
   a first end portion having a first branch end optically coupled to said light source and a second branch end optically coupled to said photodetector, and
   a second end portion having a first branch end fixedly positioned relative to said beamsplitting means and optically coupled to said beamsplitting means to project the optical beam onto said beamsplitting means, a second branch end fixedly positioned relative to said beamsplitting means and optically coupled to said beamsplitting means to receive the reference beam, and a third branch end fixedly positioned on the beam axis opposite said variable filter from said beamsplitting means to receive the subject beam.

4. An optical position sensor as recited in claim 3, wherein the distance from said beamsplitting means to said photodetector along a first optical path which includes said second branch end of said second end portion is a constant non-unity multiple of the distance from said beamsplitting means to said photodetector along a second optical path which includes said third branch end of said second end portion.

5. An optical sensor as recited in claim 4, wherein said comparing means includes time demultiplexing means for separating the reference signal from the subject signal based on the respective times of arrival of the reference beam and the subject beam at said photodetector.

6. An optical sensor as recited in claim 3, wherein said second branch end of said second end portion includes delay means for delaying the reference beam relative to the subject beam.

7. An optical sensor as recited in claim 6, wherein said delay means comprises a coiled segment of an optical fiber.

8. An optical sensor as recited in claim 3, wherein said third branch end of said second end portion includes delay means for delaying the subject beam relative to the reference beam.

9. An optical sensor as reicted in claim 8, wherein said delay means comprises a coiled segment of an optical fiber.

* * * * *

UNITED STATES PATENT AND TRADEMARK OFFICE
CERTIFICATE OF CORRECTION

PATENT NO. : 5,017,771

DATED : May 21, 1991

INVENTOR(S) : Richard D. Bartholomew, et al

It is certified that error appears in the above-identified patent and that said Letters Patent is hereby corrected as shown below:

IN THE CLAIMS:

Column 10, line 3, change "conduits" to --conduit--; and line 15, change "form" to --from--.

Signed and Sealed this

Twenty-seventh Day of October, 1992

Attest:

DOUGLAS B. COMER

*Attesting Officer*     Acting Commissioner of Patents and Trademarks